United States Patent [19]
Lenertz

[11] Patent Number: 5,596,871
[45] Date of Patent: Jan. 28, 1997

[54] DECELERATION FUEL CONTROL SYSTEM FOR A TURBINE ENGINE

[75] Inventor: James E. Lenertz, Scottsdale, Ariz.

[73] Assignee: AlliedSignal Inc., Morris Township, N.J.

[21] Appl. No.: 455,802

[22] Filed: May 31, 1995

[51] Int. Cl.$^6$ .................................................. F02C 9/28
[52] U.S. Cl. ........................................ 60/39.03; 60/39.281
[58] Field of Search .......................... 60/39.03, 39.27, 60/39.281, 39.091

[56] References Cited

U.S. PATENT DOCUMENTS

| | | |
|---|---|---|
| 3,854,287 | 12/1974 | Rembold . |
| 4,134,258 | 1/1979 | Hobo et al. ........................ 60/39.281 |
| 4,209,979 | 7/1980 | Woodhouse ........................ 60/39.281 |
| 4,248,042 | 2/1981 | Larsen et al. . |
| 4,258,545 | 3/1981 | Slater . |
| 4,307,451 | 12/1981 | Zagranski et al. . |
| 4,344,141 | 8/1982 | Yates . |
| 4,783,957 | 11/1988 | Harris . |
| 4,912,642 | 3/1990 | Larsen et al. . |
| 5,083,277 | 1/1992 | Shutler . |
| 5,142,860 | 9/1992 | Strange et al. . |

*Primary Examiner*—Louis J. Casaregola
*Attorney, Agent, or Firm*—James W. McFarland

[57] ABSTRACT

An improved deceleration fuel control system and related method are provided for regulating fuel flow to a combustor of a gas turbine engine to permit deceleration as a maximum rate without risk of combustor blowout. The system includes a controller responsive to combustor air flow and engine shaft speed to calculate a minimum fuel-air ratio to sustain a combustor flame during a maximum rate deceleration condition. The controller then regulates fuel supply to maintain a deceleration fuel-air ratio at a selected safety margin higher than the calculated minimum to sustain combustion.

17 Claims, 2 Drawing Sheets

DECELERATION FUEL CONTROL SYSTEM FOR A TURBINE ENGINE

The U.S. Government has certain rights in this invention pursuant to Contract No. DAAJ09-92-C-0453 with the United States Army.

BACKGROUND OF THE INVENTION

This invention relates generally to improvements in fuel systems and related controllers for use in gas turbine engines. More particularly, this invention relates to a fuel control system and method for scheduling fuel supply to a turbine engine during a deceleration condition to permit maximum rate deceleration without risk of combustor blowout.

Gas turbine engines are well known in the art and generally comprise a turbocompressor rotating group in association with a combustor. A compressor stage at one end of the turbocompressor rotating group draws in and compresses air for supply to the combustor for appropriate combustion with fuel. The resultant hot and high energy gases of combustion are directed in driving association with a compressor stage at the opposite end of the turbocompressor rotating group. Engine work output is obtained by mechanical drive means coupled to the rotating shaft of the turbocompressor rotating group, and/or by passing the combustion gases from the turbine stage through an appropriate thrust nozzle.

In some operating environments, the gas turbine engine is subjected to relatively rapid transient speed conditions, wherein combustor blowout or flameout can occur. In particular, during a rapid engine deceleration phase, the fuel supply to the combustor is rapidly curtailed. If the fuel supply to the combustor, in relation to the corresponding air flow provided by the compressor stage, falls below a minimum level for even a brief interval, there is a substantial risk that the combustor flame will be extinguished. This prospect of combustor blowout is, of course, extremely undesirable especially in gas turbine engines used to power aircraft.

In the past, substantial design effort has focused upon improvements in fuel controls for regulating the supply of fuel to the combustor of a gas turbine engine. Such fuel controls have been adapted for response to numerous engine operating parameters in an attempt to optimize combustor fuel flow throughout a range of engine operating conditions. For example, prior fuel controls have responded to parameters such as aircraft altitude, ram air effects, air temperature, etc. However, other variables such as part-to-part variations in combustor performance and stability and other mechanical engine influences have complicated the design of fuel controls, especially in response to a rapid deceleration condition. To prevent fuel control overshoot and resultant risk of combustor blowout during deceleration, prior fuel controls have generally functioned by attempting to limit the rate at which engine deceleration can occur.

The present invention provides a significant improvement upon fuel control systems and related methods for scheduling fuel supply to a gas turbine engine during a deceleration condition, wherein the fuel control system is responsive to a small number of parameters to accommodate deceleration at a substantially maximum rate but without risk of combustor blowout.

SUMMARY OF THE INVENTION

In accordance with the invention, an improved fuel control system and related method are provided for regulating fuel supply to a combustor of a gas turbine engine during a deceleration phase. The fuel control system includes a controller responsive to a small number of engine parameters to calculate a minimum fuel-air ratio and related minimum fuel flow to sustain a combustor flame during a maximum rate deceleration condition. The controller then regulates actual fuel supply to the combustor to maintain fuel-air ratio at a selected safety margin higher than the calculated minimum.

In the preferred form, the controller comprises a digital fuel controller for closely regulating fuel flow from an appropriate fuel supply to the engine combustor. The controller responds to actual engine speed, as represented by the rotating speed of a turbocompressor rotating group having a compressor stage and a turbine stage mounted on a common shaft. The monitored engine speed is correlated with selected temperature and pressure parameters associated with the compressor stage to determine or calculate actual instantaneous combustor air flow. In the preferred form, the engine rotating speed is correlated with the inlet temperature and discharge pressure of the compressor stage to calculate combustor air flow.

From these parameters, which are conveniently derived from a relatively small amount of combustor testing to determine performance characteristics applicable to a particular combustor design, the controller determines the minimum fuel-air ratio required to sustain a combustor flame and then regulates fuel supply to maintain actual fuel flow to the combustor at a selected safety margin above the calculated minimum.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

As shown in the exemplary drawings, the present invention pertains to an improved fuel control system and related method for supplying fuel to a gas turbine engine 10 during a deceleration phase. The fuel control system includes a controller 12, preferably a digital controller, having a memory programmed for accurate and precision scheduling of engine fuel flow during deceleration to accommodate deceleration at a substantially maximum rate but without risk of engine blowout or flameout.

Figure 1:
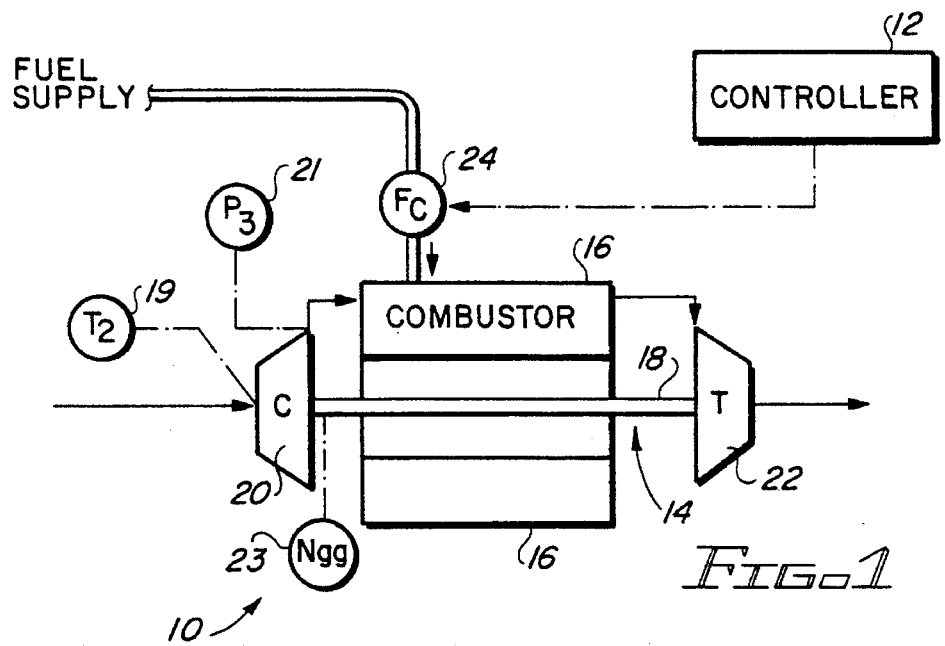
FIG. 1 is a schematic diagram illustrating a gas turbine engine adapted for deceleration fuel control in accordance with the present invention.

The exemplary gas turbine 10 illustrated in FIG. 1 includes a turbocompressor rotating group 14 in combination with a combustor 16. As is known in the art, the turbocompressor rotating group 14 comprises a rotary shaft 18 which interconnects a compressor stage 20 and a turbine stage 22. Air is drawn in by the compressor stage 20 and is compressed for discharge supply to the combustor 16. Fuel from a suitable fuel supply is also delivered to the combustor 16 via a fuel control 24 which is operated by the controller 12, as will be described in more detail. The fuel and compressed air supplied to the combustor 16 are burned to develop a high mass flow of heated and high energy combustion gases which are then expanded through the turbine stage 22.

The controller 12 is designed for programmable response to a small number of engine parameters to schedule actual fuel supply to the combustor 16 during a deceleration condition, in a manner designed to prevent combustor blowout. Importantly, in general terms, the controller 12 is primarily responsive to a combustor performance factor related to combustor air flow, wherein this performance factor can be predetermined for a particular model or style with a relative minimum of laboratory testing to determine and account for part-to-part variations. With such minimal testing, in accordance with the present invention, a deceleration fuel flow schedule can be determined analytically in relation to engine speed, as represented by the rotational speed of the shaft 18, for precision regulation of fuel flow to the combustor during deceleration. The resultant deceleration fuel flow schedule beneficially accommodates engine deceleration as a substantially maximum rate, while safeguarding the combustor 16 against undesired flameout.

Figure 2:
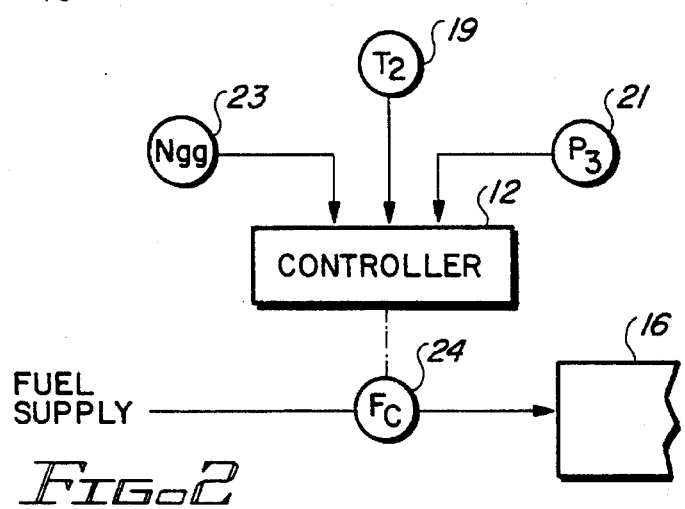
FIG. 2 is a schematic diagram illustrating a digital controller and related engine parameter inputs in accordance with the invention.

FIG. 2 is a schematic diagram depicting parameter input to the digital controller 12, with appropriate cross reference to sensors shown in FIG. 1. More specifically, in the preferred form of the invention, the controller 12 responds to inputs representing air temperature ($T_2$) at the inlet of the compressor stage 20 as detected by a temperature sensor 19, air pressure ($P_3$) at the discharge side of the compressor stage 20 as detected by a pressure sensor 21, and the rotational speed ($N_{gg}$) of the gas generator as detected by a speed sensor 23 which monitors the rotational speed of the shaft 18. These sensors 19, 21 and 23 may take a standard form, and each generates an appropriate signal representative of the monitored parameter for input to the controller 12. During a deceleration condition, the controller 12 responds to these three inputs to operate the fuel control 24 in a manner achieving the fastest possible engine deceleration without risk of combustor blowout.

Figure 3:
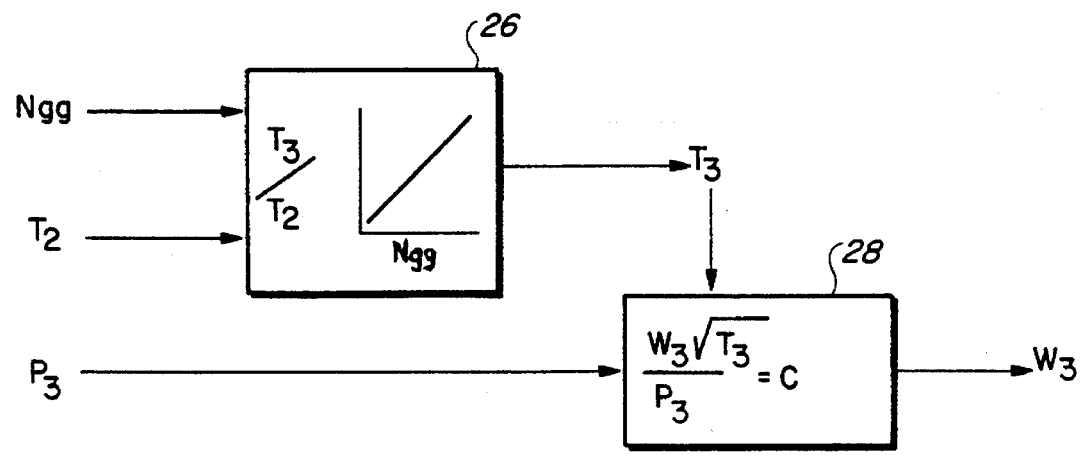
FIG. 3 is a schematic diagram representing controller response to determine combustor air flow.

The response of the controller 12 to the input parameters, as depicted generally in FIG. 2, is shown is more detail in FIGS. 3–6. With reference to FIG. 3, there is a known relationship between gas generator speed ($N_{gg}$) and the ratio of the discharge temperature ($T_3$) to the intake temperature ($T_2$) across the compressor stage 20. Block 26 in FIG. 3 represents this known relationship, wherein the gas generator speed ($N_{gg}$) will be understood by persons skilled in the art to represent a so-called corrected speed to account for operational characteristics of the compressor wheel or impeller and related passage geometry. The controller 12 is programmed to implement this known functional relationship so that compressor stage discharge temperature ($T_3$) can be derived from input parameters representing gas generator speed ($N_{gg}$) and temperature ($T_2$) at the inlet side of the compressor stage. Alternatively, in some applications, the temperature ($T_3$) of air at the discharge side of the compressor stage can be directly monitored, in which case the calculation step represented by block 26 may be omitted.

As shown further in FIG. 3, the temperature ($T_3$) of air at the discharge side of the compressor stage 20 is utilized in conjunction with the input parameter representing the air pressure ($P_3$) at the discharge side of the compressor stage, to determine air flow ($W_3$) through the combustor 16 during a rapid deceleration condition. Specifically, block 28 in FIG. 3 sets forth a computational relationship between these factors, wherein C is a constant obtained from compressor testing in a so-called choke flow condition where the air flow rate through the compressor stage and thus also through the combustor is at a measurable or otherwise known maximum rate. From laboratory testing of a small number of a specific combustor model or type, wherein the test number is selected to compensate for part-to-part variation, the constant C can be derived provided combustor inlet temperature ($T_3$) and pressure ($P_3$) are also known. Thereafter, the controller 12 is programmed to include the tested value for the constant C, whereby the controller 12 may respond further to the compressor stage discharge or combustor inlet temperature ($T_3$) and pressure ($P_3$) to determine combustor air flow ($W_3$) in the choke flow condition representing the worst case condition during rapid deceleration.

Figure 4:
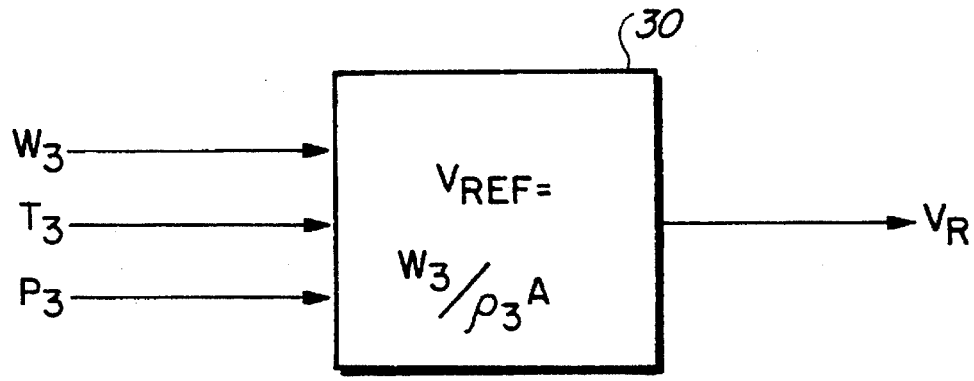
FIG. 4 is a schematic diagram illustrating further response of the controller to determine a reference velocity used to calculate engine fuel-air ratio.
Figure 5:
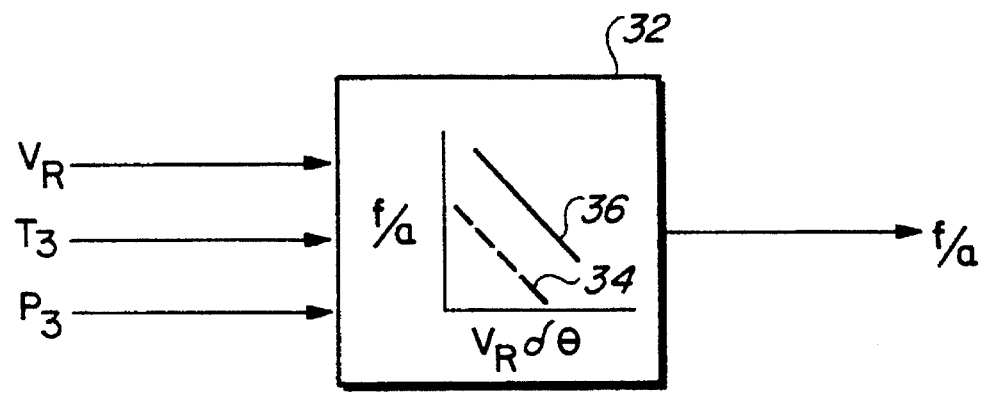
FIG. 5 is a further schematic diagram representing operation of the controller to determine fuel-air ratio.

FIGS. 4 and 5 illustrate further programmed computation by the controller 12 to determine a minimum fuel-air ratio for the fastest possible engine deceleration without combustor blowout, and then to apply a selected safety margin to insure that the actual fuel-air ratio exceeds the minimum by a predetermined safety threshold. FIG. 4 shows utilization of the combustor inlet temperature ($T_3$) and pressure ($P_3$) parameters in conjunction with combustor air flow ($W_3$), including an additional parameter A representing the average cross sectional area of the combustor 16. This correlation is represented in FIG. 4 by block 30, wherein ($\rho_3$) represents an air density factor equal to the compressor discharge pressure ($P_3$) over the product of compressor discharge temperature ($T_3$) and a universal gas constant for air (53.3).

The resultant reference velocity ($V_r$) is then used with the temperature ($T_3$) and pressure ($P_3$) parameters as shown by block 32 in FIG. 5 to determine the minimum fuel-air ratio (f/a) for sustaining a flame in the combustor during a maximum deceleration condition. In this regard, there is a known correlation between this minimum fuel-air ratio (f/a) as a function of the reference velocity ($V_r$) times a reference pressure ($\delta$) and a reference temperature ($\theta$). In particular, the reference pressure ($\delta$) equals ($P_3$)/(ambient pressure), and the reference temperature ($\theta$) equals $(T_3)° R/(519° R)$. This relationship is shown in block 32 in FIG. 5 by the dotted line 34. If the fuel-air ratio (f/a) falls below this line 34 during a rapid deceleration condition, combustor blowout is likely to occur. To insure that blowout does not occur, a selected higher fuel-air ratio (f/a) relative to the line 34 is chosen. This higher fuel-air ratio (f/a) is shown in FIG. 5 by the solid line 36 which will typically extend generally in parallel to the minimum plot 34, with a margin of safety on the order of about 20%.

Figure 6:
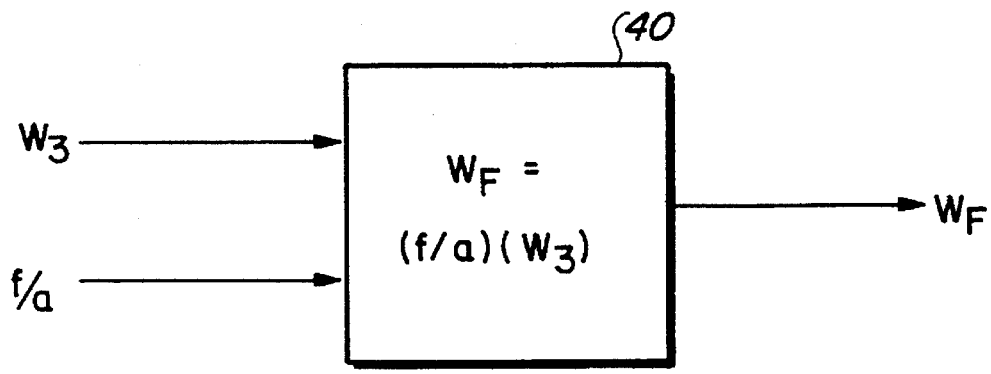
FIG. 6 is a schematic diagram depicting operation of the controller to determine instantaneous engine fuel flow during a deceleration condition.

FIG. 6 illustrates further determination by the controller 12 to regulate actual fuel flow in response to the derivations discussed above. In particular, the product of the fuel-air ratio (f/a) and the combustor air flow ($W_3$) yields the fuel flow ($W_f$). The controller 12 is programmed to perform this calculation as indicated at block 40 using a fuel-air ratio (f/a) conforming, for example, to the solid line 36 in FIG. 5, to insure that substantially maximized engine deceleration can occur but with an actual fuel flow at a selected safety margin above the minimum fuel needed to sustain a combustor flame during deceleration.

Accordingly, in operation, the controller 12 is preprogrammed to perform the data manipulation steps shown and described in FIGS. 2–6, including inputted values for the various constants and the combustor flow area A. Thereafter, during engine operation, the controller 12 responds to a small number of monitored parameters to derive an optimized fuel flow to accommodate a substantially optimized engine deceleration condition without combustor blowout. The controller 12 implements the foregoing derivations by appropriate operation of the fuel control 24 (FIG. 1) to regulate combustor fuel supply in accordance with the optimized deceleration fuel-air ratio (f/a) with appropriate safety margin to prevent combustor blowout.

A variety of further modifications and improvements to the improved fuel control system of the present invention will be apparent to those skilled in the art. Accordingly, no limitation on the invention is intended by way of the foregoing description and the accompanying drawings, except as set forth in the appended claims.

What is claimed is:

1. A fuel control system for regulating fuel flow to a turbine engine having a turbocompressor rotating group with a compressor stage and a turbine stage, a combustor, and fuel supply means for supplying fuel to the combustor, said fuel control system comprising:

sensor means for monitoring engine parameters indicative of combustor air flow and engine rotational speed and for generating sensor signals representative thereof; and a controller responsive to said sensor signals and a known choke flow constant for the compressor stage to derive combustor air flow, and for responding to the derived combustor air flow for regulating said fuel supply means to maintain an actual fuel flow to the combustor in relation to combustor air flow sufficient to sustain combustion during an engine deceleration condition.

2. The fuel control system of claim 1 wherein said sensor means comprises a temperature sensor for monitoring air temperature at an inlet side of the compressor stage, and a pressure sensor for monitoring air pressure at a discharge side of the compressor stage.

3. The fuel control system of claim 2 further including a speed sensor for monitoring rotational speed of a shaft coupled between the compressor and turbine stages of the turbocompressor rotating group.

4. The fuel control system of claim 3 wherein said controller is responsive to said temperature, pressure and speed sensors to derive combustor air flow.

5. The fuel control system of claim 1 wherein said controller is responsive to the derived combustor air flow to derive a minimum fuel-air ratio to sustain combustion during an engine deceleration condition, and for regulating the fuel supply means to maintain the actual fuel-air ratio at least equal to said minimum fuel-air ratio.

6. The fuel control system of claim 5 wherein said controller regulates the fuel supply means to maintain the actual fuel-air ratio at a selected safety margin higher then said minimum fuel-air ratio.

7. The fuel control system of claim 1 wherein said controller is responsive to the derived combustor air flow to derive a minimum fuel flow to sustain combustion during an engine deceleration condition, and for regulating the fuel supply means to maintain the actual fuel flow at least equal to said minimum fuel flow.

8. The fuel control system of claim 7 wherein said controller regulates the fuel supply means to maintain the actual fuel flow at a selected safety margin higher than said minimum fuel flow.

9. The fuel control system of claim 1 wherein said sensor means includes pressure and temperature sensors for monitoring air flow pressure and temperature with respect to the compressor stage, and a speed sensor for monitoring the rotational speed of the compressor stage, said controller being responsive to said sensors to derive combustor air flow.

10. A method of regulating fuel flow to a combustor of a turbine engine having a compressor stage and a turbine stage, and fuel supply means for supplying fuel to the combustor, said method comprising the steps of:

monitoring engine parameters representative of combustor air flow and engine rotational speed, and generating sensor signals representative thereof;

responding to said sensor signals and a known choke flow constant for the compressor stage to derive combustor air flow; and responding to the derived combustor air flow to regulate the fuel supply means to maintain an actual fuel flow to the combustor in relation to combustor air flow sufficient to sustain combustion during an engine deceleration condition.

11. The method of claim 10 wherein said monitoring and generating step comprises monitoring air temperature and pressure with respect to the compressor stage, and monitoring the rotational speed of a shaft connected between the compressor and turbine stages.

12. The method of claim 11 wherein said temperature and pressure monitoring steps include monitoring the temperature of air at an inlet side of the compressor stage, and monitoring the pressure of air at a discharge side of the compressor stage.

13. The method of claim 10 wherein said responding step comprises responding to the derived combustor air flow to derive a minimum fuel-air ratio to sustain combustion during an engine deceleration condition, and regulating the fuel supply means to maintain an actual fuel-air ratio at least equal to the minimum fuel-air ratio.

14. The method of claim 13 wherein the regulating step comprises regulating the fuel supply means to maintain an actual fuel-air ratio higher than the minimum fuel-air ratio by a predetermined safety margin.

15. The method of claim 10 wherein said responding step comprises responding to the derived combustor air flow to derive a minimum fuel flow to sustain combustion during an engine deceleration condition, and regulating the fuel supply means to maintain an actual fuel flow at least equal to the minimum fuel flow.

16. The method of claim 15 wherein the regulating step comprises regulating the fuel supply means to maintain an actual fuel flow higher than the minimum fuel flow by a predetermined safety margin.

17. A method of regulating fuel flow to the combustor of a turbine engine having a compressor stage and a turbine stage, and fuel supply means for supplying fuel to the combustor, said method comprising the steps of:

subjecting the compressor stage to a choke flow condition and deriving a choke flow constant for the compressor stage;

monitoring engine parameters representative of combustor air flow and engine rotational speed;

responding to the derived engine parameters and the choke flow constant to derive combustor air flow; and responding to the derived combustor air flow to regulate the fuel supply means to maintain at least a minimum fuel-air ratio to the combustor sufficient to sustain combustion during an engine deceleration condition.

* * * * *